J. F. LAMB.
HANDLE.
APPLICATION FILED JULY 20, 1917.

1,333,760.

Patented Mar. 16, 1920.

INVENTOR.
Joseph F. Lamb:

BY his ATTORNEY.

UNITED STATES PATENT OFFICE.

JOSEPH F. LAMB, OF NEW BRITAIN, CONNECTICUT, ASSIGNOR TO LANDERS, FRARY & CLARK, OF NEW BRITAIN, CONNECTICUT, A CORPORATION OF CONNECTICUT.

HANDLE.

1,333,760.  Specification of Letters Patent.  Patented Mar. 16, 1920.

Application filed July 20, 1917. Serial No. 181,840.

*To all whom it may concern:*

Be it known that I, JOSEPH F. LAMB, a citizen of the United States, and a resident of New Britain, in the county of Hartford, State of Connecticut, have invented certain new and useful Improvements in Handles, of which the following is a specification.

The object of the invention is to provide for the firm and secure fastening of a handle to a utensil.

In the drawings—

Figure 1:
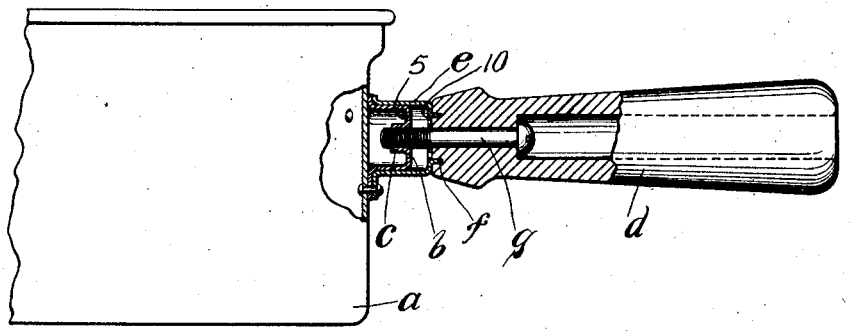
Figure 1 is a longitudinal sectional view.
Figure 2:
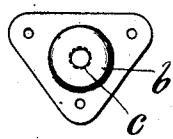
Fig. 2 is an end view of the inner bushing.
Figure 3:
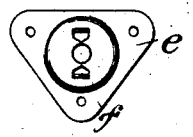
Fig. 3 is an end view of the outer bushing.

Referring to the drawings, $a$ denotes a utensil of some kind, it is not material what: $b$, is an anchoring member in the nature of a boss, preferably hollow and made from sheet metal. Secured to the utensil, $e$, is a bushing closely fitting the boss $b$ and which may also be secured to the utensil. The end walls 5, 10, of the boss $b$ and bushing $e$, are spaced apart and are apertured in alinement. $d$ is a handle fitting against the end wall of the bushing $c$ and interengaged therewith so as to prevent the handle from turning, as by the projections $f$. $g$ is a securing member, as a screw, mounted in the handle supported in the apertures in the end walls of the boss $b$ and bushing $e$ and having threaded engagement with one of the said end walls. As shown, the end wall 5, of the boss $b$, is flanged down around the center aperture as at $c$, and threaded to receive the screw.

The handle securing means here described provides spaced supports for the attaching screw constituting an extremely strong and well-braced structure little liable to get out of order.

The foregoing description is based upon the embodiment of the invention selected for illustration, but it is obvious that there are other methods by which the invention here disclosed may be utilized, that invention broadly considered consisting in the provision of two spaced supports for the handle securing part. It also is obvious that the form of the supports here illustrated can be varied in many ways and that the telescoping structure, though preferable, is not essential.

In accordance with the provisions of the patent statutes I have described the principle of operation of my invention, together with the apparatus which I now consider to represent the best embodiment thereof; but I desire to have it understood that the apparatus shown is only illustrative, and that the invention can be carried out by other means.

I claim as my invention:—

In a handle securing device for utensils, a hollow sheet metal boss secured to the utensil and provided with a closed end having a threaded aperture; a hollow sheet metal bushing closely telescoping over said boss and provided with a closed end spaced from the closed end of said boss and having an aperture alined with the threaded aperture of said boss; a handle with its forward end abutting against the end wall of said bushing; and a screw extending from the forward end of said handle through said aperture in said bushing and into the aperture of said boss, said screw having a support in the aperture of said bushing and being threaded into the aperture of said boss.

JOSEPH F. LAMB.

Witnesses:
BLISS W. CLARK,
CLIFTON W. SWEET.